United States Patent [19]

Young

[11] 3,903,029

[45] Sept. 2, 1975

[54] BIODEGRADABLE ALPHA POLYOLEFIN COMPOSITIONS CONTAINING A MIXTURE OF PARA-ALKANOLAMINO PHENOLS

[75] Inventor: David W. Young, Homewood, Ill.

[73] Assignee: Howard E. C. Hall, CosCob, Conn.

[22] Filed: July 22, 1974

[21] Appl. No.: 490,276

Related U.S. Application Data

[63] Continuation-in-part of Ser. No. 343,110, March 20, 1973, abandoned.

[52] U.S. Cl. ........ 260/23 H; 252/525; 260/45.9 NC; 260/96 D; 260/DIG. 43
[51] Int. Cl. ............................................. C08f 1/88
[58] Field of Search ............ 260/45.9 NC, DIG. 43, 260/94.9 GC, 93.7, 96 D, 18 R, 23 H; 252/525

[56] References Cited
UNITED STATES PATENTS

| | | | |
|---|---|---|---|
| 2,654,722 | 10/1953 | Young et al. | 260/45.9 NC |
| 2,901,502 | 8/1959 | Young et al. | 260/45.9 NC |
| 2,934,517 | 4/1960 | Young | 260/45.9 NC |
| 3,073,863 | 1/1963 | Croxall et al. | 260/45.9 NC |
| 3,288,885 | 11/1966 | Green et al. | 260/45.9 NC |
| 3,454,510 | 7/1969 | Newland et al. | 260/23 H |
| 3,647,111 | 3/1972 | Stager et al. | 260/DIG. 43 |
| 3,726,830 | 4/1973 | Heuser et al. | 260/45.9 NC |
| R26,158 | 2/1967 | Tholstrup | 260/45.9 NC |

FOREIGN PATENTS OR APPLICATIONS

| | | | |
|---|---|---|---|
| 617,951 | 4/1961 | Canada | 260/45.9 NC |
| 1,309,355 | 10/1962 | France | 260/45.9 NC |

*Primary Examiner*—Eugene C. Rzucidlo
*Attorney, Agent, or Firm*—Morton, Bernard, Brown, Roberts & Sutherland

[57] ABSTRACT

A composition containing an α-olefin polymer and a plurality of para-alkanoylaminophenols exhibits enhanced degradation, particularly biodegradation, of the composition. The composition remains stable over a substantial period of time under normal storage conditions and is not unduly sensitive to degradation merely due to the presence of ultraviolet light although pro-oxidants, ultraviolet light absorbers, and the like, may be incorporated into the composition to enhance degradation by ultraviolet light, if desired.

27 Claims, No Drawings

BIODEGRADABLE ALPHA POLYOLEFIN COMPOSITIONS CONTAINING A MIXTURE OF PARA-ALKANOLAMINO PHENOLS

This application is a continuation in part of application Ser. No. 343,110, filed Mar. 20, 1973, now abandoned.

The present invention relates to degradable compositions containing polymers of α-olefins, hereafter referred to as poly-α-olefins. The present invention also pertains to novel compositions which promote the degradation of compositions containing poly-α-olefins when incorporated therein. By this invention, it has been found that incorporation of both a lower carbon number para-alkanoylaminophenol and a higher carbon number para-alkanolylaminophenol will promote the deterioration, particularly biodegradation, in compositions containing α-olefin polymers when these para-alkanoylaminophenols are intimately contained therein. The biodegradation of α-olefin polymeric compositions containing the additive para-alkanoylaminophenols of this invention may occur even in the absence of light, thereby enabling the polymer to be, for example, buried as a means of disposal and still be degraded. Biodegradation of the composition may occur through biodegradation of the polymer itself, especially when it is a polymer of a monomer having at least 3 or 4 carbon atoms, or the biodegradation may be of the para-alkanoylaminophenols which may result, for example, in degradation of the physical form of the polymeric article, such as a film. The contact of moisture with the composition undergoing degradation seems advantageous, and may be more significant to degradation of some compositions such as polyethylene-based materials. Also, contact with ultraviolet light along with the moisture may enhance degradation of the polymeric compositions. Warm temperatures, e.g. above about 50° or 70°F., may also serve to promote degradation of the polymer compositions.

The disposal of articles made with α-olefin polymers in an ecologically safe manner has been the subject of much concern. Generally, α-olefin polymers are relatively inert to the mechanisms which cause deterioration of articles, which may be constructed of, for instance, paper, wood, etc., to decomposed forms which are not harmful to ecology. Articles made from α-olefin polymers when disposed of may remain undegraded since they are resistant to assimilation by microorganisms or deterioration from exposure to radiation energy, particularly ultraviolet light, even for considerable periods of time. As society continues to employ α-olefin polymers for a great number of commercial uses due to their inexpensiveness, ease of handling and consumer appeal, their efficient and inexpensive disposal without pollution is required and is becoming more critical as time passes.

Many proposals for the disposal of α-olefin polymers have been infeasible or have met with limited success. For instance, front end separation in solid waste disposal systems has been suggested for the removal of non-biodegradable polymeric materials from refuse prior to using the refuse in land fill. The polymeric materials could be used as fuel for power plants or for recycling. However, separation of polymeric materials entails considerable additional costs in waste disposal as well as being an unpleasant task. Due to the expense involved, most likely only large metropolitan areas having a unified sanitary system could adopt front end separation, if at all. Such separation would, therefore, be unavoidable to a large segment of the population living in smaller cities, suburbs, and in rural areas. Moreover, as the use of α-olefin polymers increases for disposable wrappers or containers for high sales volume consumer items, the tendency of these items to comprise a significant portion of litter along highways, in forests and fields, and in bodies of water is noted. These littered items may remain intact for even centuries, creating an essentially permanent eyesore. An advantageous use of α-olefin polymer films is for agriculture mulches to prevent growth of weeds while promoting growth of the plant crop by maintaining the soil warm and moist. However, a serious economic disadvantage exists in that the mulch films must be lifted from the field and disposed of by the farmer when their use is terminated. To avoid this type of economic hardship, degradable films are desirable which need not require special handling for their disposal.

Investigations have been conducted to provide α-olefin polymers which are photodegradable. Photodegradable polymers have, however, met with little success. The expense of ultraviolet light sensitizers or degradation catalysts often raises the cost of the polymer composition to a level where it cannot compete with alternative materials which are degradable such as paper and the like. Moreover, photodegradable polymers usually only degrade in the presence of strong sunlight. Thus, any polymer which is buried or is not exposed to sunlight will remain undeteriorated. Also, the amount of ultraviolet light sensitizers or degradation catalysts employed with the polymer will depend upon the location in which it is used. Hence, a polymer composition designed for degradation at the conditions in, for instance, Florida may take an excessive period of time to degrade in Minnesota. Conversely, a polymer composition designed for Minnesota may degrade before it can be used or before its use is completed in Florida, rendering its commercial value nearly nil. The high mobility of society may prove a photodegradation system to be infeasible for many consumer applications.

Heretofore, acyl-p-aminophenols have been suggested as effective oxidation inhibitors and stabilizers for solid organic materials which usually degrade in the presence of air and/or heat. See Young et al., U.S. Pat. No. 2,654,723. The use of N-acyl-p-aminophenols in a composition to stabilize most formaldehyde polymers is disclosed by Green, et al., in U.S. Pat. No. 3,288,885. Conventional slip additives for the production of polyethylene and polyisobutylene sheeting, such as stearic acid, are disclosed in, for instance, U.S. Pat. No. 3,588,762.

In accordance with this invention the incorporation of both a lower carbon atom para-alkanoylaminophenol and a higher carbon atom para-alkanoylaminophenol in compositions containing a poly-α-olefin has been found to promote chemical or physical degradation, e.g. biodegradation, of the compositions. Para-alkanoylaminophenols may be illustrated by the formula:

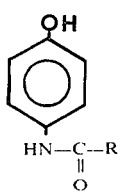

wherein, for the lower carbon atoms para-alkanoylaminophenol, hereafter referred to as the lower para-alkanoylaminophenol, R is an alkyl group of from 1 to about 3 carbon atoms, i.e., the alkanoyl group has from 2 to about 4 carbon atoms, and for the higher carbon atoms para-alkanoylaminophenol, hereinafter referred to as the higher para-alkanoylaminophenol, R is an alkyl group of from 2 to about 20 carbon atoms, i.e., the alkanoyl group has from 3 to about 21 carbon atoms, preferably R is 2 to about 8, with the proviso that the higher para-alkanoylaminophenol has an alkanoyl group with a greater number of carbon atoms than that of the lower para-alkanoylaminophenol. Each of the lower and the higher para-alkanoylaminophenols is present as a minor amount in the polymer composition and is in an amount sufficient that the overall amount of alkanoylaminophenol promotes the desired degradation of the composition. The presence of the lower alkanoylaminophenol may hasten the degradation of the composition to a greater degree than the same amount of the higher alkanoylaminophenol. Thus, the rate of degradation of the composition may primarily depend upon the amount of lower alkanoylaminophenol incorporated. Of course, the higher alkanoylaminophenol may contribute with the lower alkanoylaminophenol to provide the enhanced degradation of the composition. The higher alkanoylaminophenol is present in an amount sufficient to prevent unduly excessive loss of the lower alkanoylaminophenol from the polymeric composition, which loss is apparently due to the lesser degree of compatibility of the lower alkanoylaminophenol with the polymer than the higher alkanoylaminophenol. Generally, the weight ratio of the higher to the lower alkanoylaminophenol in the polymeric composition, or in a pre-formed additive mixture to be incorporated in the polymeric composition, is at least about 1:10, say about 1:10 to 2:1, preferably about 1:3 to 1.5:1. The particular ratio of the alkanoylaminophenols employed in a selected instance may be dependent on several variables. For instance, the selection of the ratio and relative molecular weights of the alkanoylaminophenols may depend on the particular α-olefin polymer with which they are combined to promote the desired degradation. The solubility of the alkanoylaminophenols may be yet another factor. Generally, lower alkanoylaminophenol will be less stable in α-olefin polymers than higher alkanoylaminophenol. Thus, the higher alkanoylaminophenols may serve as a common solvent to enhance dispersion and retention of the lower alkanoylaminophenol within the polymer. Also, since degradation of the α-olefin polymeric composition may be hastened to a greater degree by the lower alkanoylaminophenol than by the higher alkanoylaminophenol, the number of carbon atoms in the alkanoyl groups of the lower and higher alkanoylaminophenols and by varying their relative amounts, an additive may be designed to enhance degradation of a desired composition in a given general period of time. For certain applications, it may be desirable to employ three or more alkanoylaminophenols having varying numbers of carbon atoms in the alkanoyl group to enhance a particular rate of degradation or to enhance compatibility of the alkanoylaminophenols with the polymer.

The α-olefin polymers which may be suitably employed in the present invention are those which are normally solid at room temperature and are represented by the repeating unit:

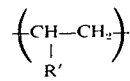

wherein R' is hydrogen or a hydrocarbon radical containing 1 to about 6 carbon atoms and preferably R' is alkyl when it is not hydrogen. Illustrative of such α-olefin polymers are polyethylene, polypropylene, poly(butene-1), poly(pentene-1), poly-(4-methylpentene-1), poly(hexene-1), and the like. Decomposition of interpolymers as well as block copolymers of α-olefins with other olefins and vinyl monomers, including vinyl monomers substituted with, for instance, halogen, e.g., chlorine, flourine and bromine; aryl and aralkyl substituents of about 5 to 8 carbon atoms, e.g., phenyl; heterocyclic substituents of about 5 to 8 carbon atoms, e.g., pyrrolidonyl; and the like may also be promoted by the composition of this invention. The α-olefins in said copolymers are preferably present in the amount of at least about 25 or 50, preferably at least about 80, weight percent of the total polymer. Thus, the term α-olefin polymer as used herein includes homopolymers and interpolymers and block copolymers of α-olefin polymers. The polymer may be high density, for instance having a specific gravity of about 0.95 for polyethylene, or low density, for instance having a specific gravity of about 0.92 for polyethylene, and in the case of, for instance, polypropylene, it may be isotactic or atactic. Advantageously, the polymer may have an average molecular weight of about 2,000 to 3,000,000; preferably about 5,000 to 1,500,000. The molecular weight may advantageously be determined employing the infrared spectral method disclosed by Rugg et al. in the *Journal of Polymer Science*, Volume XI, No. 1, pages 1 to 20. Other suitable methods of molecular weight determinations, as disclosed by Rugg et al., may also be employed if desired. The polymer or resin compositions can also include conventional additives such as colorants, stabilizers, lubricants, dispersing agents, plasticizers, fillers, and the like, and can be physically admixed with other polymeric materials.

In one aspect of this invention, the polymer composition may include utraviolet light absorbers such as octadecyl-3,5-di-tertiary-butyl-4-hydroxy-hydrocinnamate, 2-(3', 5'-di-tertiary-butyl-2'-hydroxyphenyl)-5-chlorobenzotriazole, and the like. The polymeric composition may also contain pro-oxidants including the carboxylates, alkanoylacetonates, alkyl alkanoylacetates, and the alkylbenzoyl acetates of copper, vanadium, chromium, cobalt, manganese, iron, nickel, and zinc. Exemplary of pro-oxidants are manganous stearate, manganous oleate, manganous acetate, manganous dodecyl acetoacetate, cobalt acetyl acetonate, cobaltous acetate, cobaltous naphthalenate cobaltous acetyl acetonate cobaltous oleate, cobaltous stearate, cobaltous dodecyl acetoacetate, cupric stearate, cupric oleate, ferric acetate, and the like. The pro-oxidant serves as an oxidation catalyst to promote the oxidative deterioration of the polymer at a controlled rate. The amount of pro-oxidant will depend on its activity; however, a minor amount of pro-oxidant based on the polymer is generally employed, for example, total amounts of one, or mixtures of two or more of the pro-oxidants, equally from about 0.01 to about 1.5 weight percent based on the polymer may find utility. A more detailed discussion of the use of pro-oxidants may be found in U.S. Patent No. 3,592,792, issued to Newland et al.

The polymer composition may also contain pigments and dyes to render it opaque to substantially all or selected wavelengths. Carbon black pigment, 4-[p-bis(2-hydroxyethyl)-amino-phenylazo-p-phenyleneazo]-3-hydroxy-2-naphthoic acid black dye, and the like may beneficially be employed. Generally minor amounts, for instance, about 0.05 to one or two weight percent or more based on polymer, of pigments or dyes may conveniently be employed. Other pigments are disclosed by Newland et al. in U.S. Pat. Nos. 3,592,792 and 3,454,510. Conventional stabilizers or antioxidants are often employed in the polymer composition to inhibit oxidation or inhibit reactions promoted by oxygen or peroxides to protect the composition against deterioration during processing, or protection against deterioration during the useful life of the composition. When employing the polymeric composition as, for instance, a mulch sheet, it may be highly desirable to provide significant amounts of stabilizer to prevent excessively quick deterioration of the composition due to exposure to the sunlight and weathering. The stabilizer or antioxidant employed in the polymer composition is preferably compatible with the polymer. A summary of conventional antioxidants which may find application in the polymer compositions is found in the Kirk-Othmer, *Encyclopedia of Chemical Technology*, Second Edition, Volume 2, pages 588 to 604, particularly pages 600 to 601. The stabilizers may be employed in minor amounts, e.g., from about 0.0001 to about 5 or more weight percent based on the polymer.

The amount of total alkanoylaminophenol incorporated in the α-olefin polymer composition in this invention may vary depending upon the particular polymer employed, the desired rate of degradation, the amount and nature of other conventional additives, and the like. Generally, the total lower and higher alkanoylaminophenol is in a minor amount which is sufficient to promote the desired rate of degradation of the polymeric composition, for instance, and amount of about 0.03 to 4, preferably about 0.07 to 2 weight percent based on the weight of the polymer. The amount of total alkanoylaminophenol will generally depend, in part, on the portion of lower alkanoylaminophenol therein and its number of carbon atoms in the alkanoyl group. Often, with amounts of alkanoylaminophenol in excess of about 4 weight percent based on the polymer, insubstantial increases in the rate of degradation are noted. Although such larger amounts may be employed, the rate of deterioration of the polymeric composition may be sufficiently rapid employing lesser amounts of alkanoylaminophenol, for instance, about 0.15 to 1 weight percent, that additional amounts of alkanoylaminophenol will often be unnecessary in most applications. Frequently, a greater amount of alkanoylaminophenol will be employed to promote degradation of compositions containing higher molecular weight polymers or of more highly branched polymers than of lower molecular weight and less branched polymers in order to obtain similar degradation characteristics. The amount of alkanoylaminophenol employed may also depend in part on the ratio of the lower to high molecular weight component. A polymeric composition may tend to degrade more rapidly when a higher weight ratio, rather than lower, of the lower to higher alkanoylaminophenol is present for a similar amount of total alkanoylaminophenol. On the other hand, the lower alkanoylaminophenols are generally less soluble in α-olefin polymers than the higher molecular weight alkanoylaminophenols, and hence, their incorporation into the polymer composition may therefore be limited. Often, the lower alkanoylaminophenol will comprise about 0.1 to 3, preferably about 0.03 to 2, weight percent based on the α-olefin polymer.

The alkanoylaminophenols may be incorporated into the polymer composition separately or as a mixture. It is preferred that each of the alkanoylaminophenols be well-dispersed throughout the polymer in order that the degradation of the polymer composition will not become localized due to higher concentrations of, say, the lower alkanoylaminophenol or the lower and higher alkanoylaminophenols in certain portions of the composition. When the lower and higher alkanoylaminophenols are added separately to the polymer composition, it is preferred that the polymer be passed through a molten form to enhance dispersion of the alkanoylaminophenols. It may be possible, for instance, to achieve the enhanced degradation provided by this invention by mixing the alkanoylaminophenols with particles of polymer and then cold milling the mixture, to produce, for instance, a low density sheet, to provide distribution of the alkanoylaminophenols. Another method of incorporating the alkanoylaminophenols into the polymer is by adding the highher and/or lower alkanoylaminophenol to a polymer in a higher concentration than may be desired in a finished polymer product and then adding the polymer having the higher and/or lower alkanoylaminophenol therein to polymer not having the alkanoylaminophenols therein, or having one of the alkanoylaminophenols therein, to obtain a product having the desired concentration of alkanoylaminophenols. The polymer composition containing the alkanoylaminophenol may, for instance, have about 0.3 to 15 or more, preferably about 0.5 to 5, weight percent alkanoylaminophenols therein. Since the polymer composition containing the alkanoylaminophenols may have good storage stability, the higher concentration of alkanoylaminophenols in such a polymer for addition, will have little, if any, effect on the polymeric product.

A dispersant may be incorporated in the polymer compositions to assist in the dispersion of the alkanoylaminophenols in the polymeric mass. The dispersant may also reduce the melting temperature of the alkanoylaminophenol mixture. When, for instance, the alkanoylaminophenols are mixed and subsequently combined with the polymer it is often beneficial to have the melting point of their mixture in a range compatible with the melt polymer during processing. For instance, polyethylene may be subject to degradation under excessive temperatures, e.g., in excess of about 170°C.

and, therefore, is commonly extruded at temperatures of about 125° to 155°C. A high melting alkanoylaminophenol may, however, remain in the solid phase during processing of the polyethylene and, thus, not be advantageously diffused throughout the resultant, fused polymeric body. The presence of non-melted, larger particles of alkanoylaminophenol may detract from the appearance and physical properties of the polymer composition. Dispersants may reduce the melting point of alkanoylaminophenols and thereby assist in the dispersion of the alkanoylaminophenols throughout the α-olefin polymer at convenient temperatures for polymer processing.

Particularly advantageous dispersants are the acids having at least one carboxylic acid group, e.g., monocarboxylic and dicarboxylic acids of about 10 to 30, preferably about 12 to 22 carbon atoms. The carboxylic acid may be saturated or contain one or more unsaturated carbon-carbon bonds, and may be a hydroxy acid. Exemplary of these advantageous dispersants are stearic acid, oleic acid, palmitic acid, lauric acid, myristoleic acid, myristic acid, linoleic acid, margaric acid, arachidic acid, elaidic acid, dodecanedioic acid, tetradecanedioic acid, and the like. Stearic acid is preferred due to its availability and due to its general compatibility with the composition of this invention and α-olefin polymers. The carboxylic acid dispersants may additionally serve as per-oxidation catalysts to assist the degradation of the α-olefin polymer composition.

Other dispersants which may be beneficially employed in accordance with this invention include paraffin waxes, having, for instance, about 14 to 20 to 40 or more carbon atoms, microcrystalline paraffin waxes of about 30 to 50 or more carbon atoms slightly oxidized paraffin and microcrystalline waxes, Hoeschst waxes, mildly oxidized Fischer-Tropsch waxes which are highly tertiary in structure and other synthetic waxes, and the like.

The amount of dispersant employed with the alkanoylaminophenols, if employed, is frequently in a weight ratio or dispersant to total alkanoylaminophenol of about 1:9 to 5:1, preferably about 1:6 to 1:1. Advantageously, in polyethylene compositions the dispersant is in a minor amount based on the polymer and is preferably in an amount sufficient to provide a mixture of total alkanoylaminophenol and dispersant which has a melting point in the range of fusing temperatures of the polymer, for instance, about 125° to 160°C., preferably 130° to 150°C. for polyethylene. This mixture is thus compatible in melting point to the temperatures which the polymer is subjected during physical processing of the polymer, for instance, extruding, calendering, molding, casting, and the like. The alkanoylaminophenols and the dispersant may be admixed prior to their incorporation into the polymer. Desirably, this mixture is obtained by intimately admixing finely-divided particles of the alkanoylaminophenols and dispersant. The finely-divided mixture of alkanoylaminophenols and dispersant is then well dispersed in the α-olefin polymer.

It has been found that degradability of α-olefin polymers may be enhanced when the alkanoylaminophenol components are dispersed in the polymer by mechanically milling. Examples of mechanical milling are cold milling, ball milling, and the like. Alternatively, the alkanoylaminophenol and dispersant mixture may be stirred or tumbled with the polymer, and then the resultant composition is heated to obtain a fused mass with the alkanoylaminophenol and dispersant distributed essentially uniformly throughout the polymer mass.

The polymer containing the alkanoylaminophenols in accordance with this invention may be processed and employed in any manner in which such polymer without the composition of this invention is commonly processed and used. The polymer compositions may be formed into various articles having, e.g. at least one dimension of at least about one inch, such as films, molded articles and the like. It is realized that the ability of the polymer compositions of the present invention to degrade will widen commercial acceptance of the use of α-olefin polymers due to their ecological compatibility. For instance, the polymer compositions of this invention may be employed as agriculture mulch films. Hertofore, such films have had to be removed by the farmer at the end of the growing season and disposed of, often by merely removing the used mulch film to a remote section of the farm for storage or burning. Recent proposals to eliminate labor in removing agriculture mulch films have included photodegradable films; however, the composition of these films must be dependent not only on the weather conditions at the farming location to prevent premature or excessively late decomposition, but also, on the length of the growing season for a particular crop. With mulch films of the polymer compositions of the present invention, the farmer need only turn under the film when it has served its useful purpose.

Since alkanoylaminophenols are relatively non-toxic, α-olefin polymeric compositions of this invention may advantageously be employed as wrappings and containers for foodstuffs, pharmaceuticals, feeds and the like as well as other consumer items. Advantageously, disposable sandwich and food bags, grocery bags, and the like which are often used only one time, may be made in accordance with the present invention and will degrade upon disposal after such use. The α-olefin polymer compositions of this invention have good strength, and hence, garbage bags and other containers which may hold refuse may beneficially be comprised of the α-olefin polymeric compositions of this invention. Another benefit of the present invention may be realized when it is considered that plastic garbage bags are normally sealed with a tie when filled with refuse and disposed of in, for example, land fills. since the bag is sealed, normal biodegradation of the refuse is hindered. Plastic garbage bags containing the composition of this invention may chemically or physically degrade thereby allowing entry of oxygen and microorganisms to degrade the contents of the bag. The polymeric compositions of the present invention may also advantageously be employed as coatings, for instance, coatings for paper, cardboard, and the like.

Another embodiment of the use of α-olefin polymer compositions of the present invention, is in polymer emulsions. Polymer emulsions, either aqueous or in organic liquid, may comprise finely-divided, α-olefin polymer. Frequently the polymer particles are of regular shape, for instance, essentially spherical, and have an average particle size in the range of about 8 to 30 microns. The emulsion may be employed in a wide variety of applications such as coatings, binders, additives, fillers, dispersing agents, carriers, and the like. Aqueous emulsions may be prepared from such finely-divided α-olefin polymer compositions which contain, say, about 2 to 70 weight percent solids. To provide stability, the normally hydrophobic polymer may be treated with a non-ionic, anionic, or cationic surfactant. Particularly preferred surfactants are non-ionic surfactants, especially biodegradable non-ionic surfactants such as alkylphenoxypoly(oxyethylene)ethanols. Exemplary of biodegradable non-ionic surfactants are for example, Igepal CA, CO, DM and RC series surfactants, obtainable from General Aniline & Film Corporation. Generally, minor amounts which are sufficient to stabilize the emulsion, frequently, about 0.1 to 2 weight percent of the emulsion, is surfactant. Water-soluble resins may also be employed in the aqueous polymer dispersion as thickening and emulsion stabilizing agents. Exemplary of water-soluble resins are methyl carboxycellulose, polyvinyl alcohol, polyvinyl pyrrolidone, polypeptides, and the like. The thickening agent may comprise a minor amount of the polymer to provide the desired viscosity, for instance, about 0.01 to 2 weight percent of the emulsion. Further information regarding polyolefin emulsions may be found in, for instance, "Dispersing MICROTHENE F Polyolefin Powders in Liquids", National Distillers and Chemical Corporation, 1965.

A particularly advantageous use of aqueous emulsions containing the α-olefin polymeric compositions is as an agriculture spray to protect fruit and the like, from frost, insects, and the like. The emulsions generally contain a minor amount, for example, about 5 to 15 weight percent polyolefin and about 2 to 30 weight percent of water-soluble polymer such as carboxymethyl cellulose, methyl cellulose, other cellulose ethers, polyvinyl alcohol, polyvinyl pyrrolidone, polypeptides, modified starches, ethylene oxide polymers, polyethyleneimine, and the like. The selection and amount of the water-soluble polymer and the ratio of the water-soluble polymer to polyolefin will depend in part upon the desired effect of the coating, the period of time which is desired for the coating to remain intact, and the environmental conditions. The aqueous emulsion may, for instance, be employed to spray fruit trees under threat of impending frost, and the coating may be adapted to deteriorate, through the effect of rain, agriculture watering or other moisture, and possibly sunlight, in about 12 hours to two days. The polyolefin will be carried by rain or agriculture watering or fall by gravity to the ground. Since the polyolefin composition of the invention is degradable due to the presence of the mixed para-alkanoylaminophenols, it may be degraded by micro-organisms or other means into an ecologically harmless form. The degradation of the polyolefin composition may occur not only in the soil but also in streams, rivers, and other bodies of water. Thus, polyolefin compositions which may be carried by run-off water from a field, e.g. an orchard, may be desirably degraded.

The following examples are provided to further illustrate the present invention. All parts and percentages are by weight unless otherwise indicated.

EXAMPLE I

A mixture of 50 weight percent para-acetylaminophenol, 25 weight percent of para-butyroylaminophenol, and 25 weight percent stearic acid are ball-mixed until dispersed. This mixture, hereinafter referred to as Additive A, is analyzed to contain 6.51% or nitrogen and has a bulk weight density, loose pack, of 0.43 grams per cubic centimeter and a bulk weight density, settled, of 0.63 grams per cubic centimeter. Upon being slowly heated, Additive A becomes sticky at about 57°C. and this property increases with rising temperature. The material stiffens at about 114°C. At about 135°C. the material is partially molten and is completely molten at about 143°C. The molten material is of a reddish color. The molten material is cooled and forms a solid at about 121°C. The cooled material is a grey, brittle solid.

EXAMPLE II

A high surface area, low density polyethylene sheet is prepared in the following manner. Commercially available pellets of low density polyethylene (obtained from the Northern Petrochemical Company) having a melt index of about 2.0 (British Standards Institute, B.S. 2782) are placed into a glass jar. A desired amount of Additive A is then added to the pellets and tumbled until a uniform distribution of Additive A through the polymer has been achieved. Polymer sheets containing 0.25, 0.50, 1.0, and 2.0 weight percent Additive A are prepared. Generally, to obtain a uniform mixture of polymer particles and the above prepared mixture, the tumbling is continued for about 30 to 40 minutes. The thusly prepared polymer containing the additive is placed in a two-roll mill which serves to reduce the size of the polymer particles and further the incorporation of Additive A in the polymer. After the polymer-containing mixture is roll-milled, it is cold milled at room temperature into a polymer sheet having a high surface area. The cold milling does not continue beyond a point at which sufficient mechanical strength is present to hold the film together. The polymer-containing mixture is generally passed through the cold mill from about 10 to 15 times with continual shaping in order to provide the desired weak, low density sheet of polyethylene having a high surface area. The polymer sheet is not fused.

Thus high surface area polymer film can be advantageously employed in polymer degradation tests since the degradation will be accelerated due to its high surface area and since the mechanical degradation of tfhe polymer during forming the sheet by cold milling is minimal, enabling a better evaluation of the degradation achieved employing the present invention. The polymer sheet is of an average thickness of about 7 to 11 mils. The exact thickness of the polymer sheet is not of significant importance since the degradation examples are intended primarily to demonstrate degradation of the polymer composition and not physical properties of a sheet made therefrom.

EXAMPLE III

Low density, polyethylene film containing 0.25 weight percent Additive A is prepared under commercial conditions employing a conventional extruder such as is described in "Polyethylene Film Extrusion . . . an operating manual", National Distillers & Chemical Corp., 1960. Unmodified polyethylene pellets having a density of about 0.922 grams per cubic centimeter and a melt index of about 2.0 (B.S. 2782), obtained from the Union Carbide Corporation, are admixed with 0.25 weight percent Additive A based on the mixture in a hopper at a temperature of about 250° to 270°F. The polymer composition is then extruded at about 300° to 320°F. and calendered to provide a film of 1.5 mil in thickness. The mixing, pelletizing, extruding and calendering to form the polyethylene sheet is easily accomplished, and no difficulties arise either in polymer sheet quality or manufacture due to the incorporation of Additive A. No cross-linking of the polymer in the film is observed, and the film cannot be visually distinguished from polyethylene film which is similarly processed. The nitrogen content of the polymer without Additive A is about 69 ppm (by weight), and with 0.25 weight percent Additive A, about 208 ppm (by weight).

EXAMPLE IV

Cast films of low density polyethylene having a melt index of 2.0 grams per 10 minutes (ASTM D-1238-65T) and a tensile strength at break of 1680 pounds per square inch at 20 inches per minute (ASTM D-638-68) and 0.05, 0.10, 0.15, 0.20, 0.25, 0.35, 0.40, and 0.50 weight percent of Additive A are prepared as follows. To a mixture of the polymer and Additive A is added about 5 weight percent of hot hydrocarbon solvent containing about 8 to 12 carbon atoms per molecule, and a flowable mixture results. The mixture is cast on glass which has been previously coated with a layer of castor oil to form a lubricating layer which enables easy removal of the cast film from the glass. The thickness of the film ranges from about 1.1 to 1.2 mils, and the film exhibits essentially the same physical properties as similarly cast polyethylene film without Additive A.

The biodegradability of compositions containing polyolefins and Additive A may be determined by employing laboratory tests or by actually subjecting the compositions to the natural environment. The tests conducted under laboratory conditions may be generally more severe than those expected in nature and quickly provide an indication os susceptibility of the polymer compositions to biodegradation. Typically, select microorganisms which are frequently encountered in soil or water and which have affinity towards organic matter, such as *Cladesporium resinae*, *Aspergillus terrus*, *Aspergillus niger*, *Aspergillus flavus*, *Aspergillus versicolor*, *Penicillum funiculosum*, *Trichoderma*, *Pullaria pullans*, and the like, are employed in such tests. Usually, an indication of degradation will occur in several days to three weeks. Under natural conditions, reliable indications of biodegradation may be obtained in about one month. The following examples illustrate the promotion of biodegradation of compositions of this invention in both laboratory tests and natural tests.

EXAMPLE V

In this example the biodegradability of low density sheets of polyethylene by the microorganism *Cladesporium resinae* is determined using fifty, 3-inch by 4-inch sheets of high surface area, low density polyethylene containing 0.25 weight percent of Additive A as is described in Example II. The polyethylene obtained from Northern Petrochemical Company has a melt index of 2.0, a molecular weight of about 32,000, and a tensile strength of about 1800 pounds per square inch (British Standards Institute, B.S. 903).

An agar solution is prepared as follows to coat the polyethylene film to promote development of the microorganism and thus hasten biodegradation. D.I.F.-C.O. Laboratories Sabourand Maltose agar-dehydrate having a pH of about 5 to 6 at 25°C. is melted at 100°C. and put in sufficient distilled water to make a 5 weight percent solution at about 32°C. The agar is innoculated with microorganisms from a culture of *Cladesporium resinae*. *Cladesporium resinae* is commonly found in the soil and adaptable to utilize hydrocarbon materials for its sustenance and is described in Simmons, *Quartermaster Corp., Natick Publication No.* 7998 and in *Development in Industrial Microbiology*, Chapter 27, Garamond Pridemark, p. 247. The agar and microorganism mixture are coated on one side of each of the polymer sheets. The coated films are placed in petri dishes and 5 cc. of sterile water added thereto. The petri dishes are covered and placed in a cool, dark room at about 20°C. The absence of light serves to better evaluate biodegradation since ultraviolet radiation is removed as a possible promoter of degradation.

Visual checks are made of the treated polyethylene films during the test. After five days, brown circles of the microorganism can be detected on the plastic film. After six weeks the film is washed with water and is milled slightly with a rubber tipped stirring rod to assist in removing the growth of brown-yellow *Cladesporium resinae*. The film is held for two days at 21°C. and at 65% relative humidity. The film is then cut into small pieces with a knife and molded at 300°F. to make melt flow for the samples to be used in the test. This product is held for two days at 25°C. before the tests are conducted. The sheets of polymer are analyzed to have a melt index of 5.8, a molecular weight of 28,000, and a tensile strength of 1440 pounds per square inch.

A low density polyethylene sheet containing 0.25 weight percent Additive A made in accordance with the procedure of Example II but using polyethylene obtained from the Union Carbide Corporation having a melt index of about 2.0 and a density of 0.922, is also employed in this example. Controls employing both the polyethylene sheet produced from the Northern Petrochemical Company and Union Carbide Corporation polyethylene which are made in accordance with Example II but not containing Additive A, are used. The results are provided in Table I.

Table I

|  | Northern Petrochemical Co. Polyethylene with 0.25 wt.% Additive A | Union Carbide Corp. Polyethylene with 0.25 wt.% Additive A |
|---|---|---|
| Visual Surface Area Mold Growth % After 5 Days | 20 (control:trace) | 20 (control:2) |
| Visual Surface Area Mold Growth % After 6 Weeks | 80 (control:3) | 85 (control:5) |
| Tensile Strength Loss % After 6 Weeks | 13.5 (control:3) | 25 (control:2) |

This accelerated laboratory screening shows that the addition of this invention promotes the biodegradation of the polyethylene sheets whereas control samples without the additive showed negligible deterioration.

Other screening tests employing fungi such as *Aspergellus niger*, *Aspergellus flavus*, *Aspergellus versicolor*, *Penicillium funiculosum*, *Trichoderma sp.*, and *Pullaria pullans* may also be employed to demonstrate biodegradation of polyolefin compositions. Generally, positive results are obtained within about 40 to 50 days. A particularly useful procedure in the evaluation of polymer compositions for susceptability to deterioration by microorganisms is the American society for Testing and Materials test D 1924-61T.

Another test which may be employed to determine whether or not a polymer composition may degrade is to disperse the polymer composition in finely-divided form in samples of, for instance, ordinary river, pond, or lake water and subsequently determine the deterioration by measuring weight loss of composition. This test may be convenient to conduct and may provide good indications of biodegradation or other degradation in relatively short periods of time, for instance, two or three days. Further, this test may approximate conditions to which the polymer may be exposed in that, for example, polymer film may be disposed of in a body of water or, especially, polyolefin which may be employed in an emulsion in agricultural use to coat fruit to prevent frost damage or in industrial or commercial use, may be washed into streams and rivers. Commonly, this test is referred to as the river die-away test.

EXAMPLE VI

A high surface area polyethylene sheet as described in Example II and having 0.25 weight percent Additive A is rubbed gently against itself to produce finely-divided particles. To five grams of the finely-divided particles is added 500 grams of Kankakee River water taken at the Kankakee State Park in Illinois. The sample is agitated slowly for 12 hours at 25°C. in a Waring blender. The sample is then agitated rapidly at 25°C. for 48 hours. Fresh river water is added to keep the volume constant, and the sample is shaded from any source of excessive ultraviolet radiation which may also promote polymer degradation. A sample is drawn from the blender after 72 hours and evaporated in a low-vacuum oven. The weight of the residue is determined. This is compared with a blank containing only the river water. The difference between the residue of the sample containing polymer and the blank is the weight of polymer composition remaining. This is compared with the polymer composition originally charged to obtain a weight percent of polymer composition lost or decomposed. The sample is analyzed to have a 37.8 weight percent decomposition after 72 hours.

As a comparison, 5 grams of polyethylene prepared as in Example II except containing no Additive A is added to 500 grams of Kankakee River water procured at the same time and location as above. The test procedure is repeated with the result that 4.4 weight percent of the polymer composition is lost or decomposed after 72 hours.

EXAMPLE VII

This example demonstrates biodegradability of a low density polyethylene composition of the present invention in the presence of raw sewage sludge.

A polyethylene sheet (Northern Petrochemical Company low density polyethylene) is prepared in essentially the same manner as set forth in Example II having 0.25 weight percent Additive A. The polyethylene sheet is rubbed gently against itself to produce finely-divided particles. Active raw sewage sludge is obtained from the municipal sewerage system of Hazel Crest, Illinois, and is placed in the amount of about two liters in a gryotory shaking machine which agitates the sewage and thus serves to aerate the sewage and to prevent agglomeration of solid materials in the sewage. To the sewage is added 100 milligrams per litter of the finely-divided particles of polyethylene containing Additive A, and the mixture is agitated for 100 hours at room temperature.

The sludge containing the polyethylene-containing particles is then washed with hot hexane to extract the polymer therefrom. The hexane is evaporated, and the weight of the residue is compared with the amount of polyethylene charged to the shaking machine after determining the amount of residual matter which exists in the sludge which will concurrently be extracted with hot hexane by running a blank. Approximately 31 weight percent of the polyethylene is found to be decomposed.

As a comparison, this Example is repeated except employing no Additive A in the polyethylene. The polyethylene is extracted from the sludge after 100 hours at room temperature and is analyzed to have only a 5.3 weight percent loss of polyethylene.

The above procedure is repeated except using a low density polyethylene obtained from Union Carbide Corporation which has a melt index of about 2.0 and a density of 0.922. With 0.25 weight percent Additive A, a 25.8 weight percent loss is experienced after 100 hours. A control employing the same type polymer but without any Additive A shows only a 2.6 weight percent loss after 100 hours.

It is realized that the decomposition rates demonstrated in this example will not probably remove the problem heretofore experienced in municipal sewage systems with polyolefin materials due to the normally short retention time in the system. However, the ability of microorganisms which are normally found in waste disposal systems to degrade polyolefin compositions of this invention is clearly shown.

Often, polyolefin materials such as bags, film, moldings, agriculture mulch films and the like are buried as a means of disposal. Thus, one of the significant indications of operability of a degradable polymer system is its performance in contact with soil.

EXAMPLE VIII

Low density polyethylene sheets (Northern Petrochemical Company polyethylene) containing 0.25, 0.50, 1.0, and 2.0 weight percent Additive A are prepared in accordance with the procedure set forth in Example II. The strips are tested for microbial deterioration by soil burial in a procedure which is slightly modified from that disclosed by Wendt, et al., *Int. Biodetn, Bull.*, 6(4), p. 139–43, (1970). The sheets are cut into strips of 1 inch by 8 inches and are stabilized for two days at room temperature and about 60 to 70 percent relative humidity. Each strip is placed in 1750 grams of moist, typical sandy soil obtained from Crawford County, Illinois, in a 2 liter flask. The strips are recovered at four or twenty weeks and are weighed to determine the deterioration of the polyethylene strips. As a comparison, a polyethylene strip made in accordance with Example II but without Additive A is tested in the same manner. Table II sets forth the results of the results of this example.

Table II

| Amount of Additive A, wt. % | Time in Soil, weeks | Percent weight loss |
|---|---|---|
| 0.25 | 4 | 3.9 |
| 0.25 | 20 | 37.7 |
| 0.50 | 4 | 14.7 |
| 1.0 | 4 | 19.8 |
| 2.0 | 4 | 22.3 |
| 0 | 4 | 0.03 |
| 0 | 20 | 1.6 |

To illustrate the ability to employ the system of this invention without substantial concern for particular location or soil condition, soil samples are obtained from Alachua, Florida; Anaheim, California; Lake Sardis, Mississippi; and Crawford County and Homewood, Illinois, and the above procedure is employed. Union Carbide low density polyethylene having a melt index of about 2.0 and density of 0.922 grams per cubic centimeter is employed. The results are provided in Table III.

Table III

| Location | Weeks in Soil | Weight % Loss With 0.25% Additive A | No Additive A |
|---|---|---|---|
| Alachua | 4 | 3.7 | 0.15 |
|  | 20 | 24.4 | 1.97 |
| Lake Sardis | 4 | 2.7 | 0.55 |
|  | 20 | 37.3 | 2.30 |
| Anaheim | 4 | 1.9 | 0.33 |
|  | 20 | 22.8 | 1.70 |
| Homewood | 4 | 2.7 | 0.79 |
|  | 20 | 31.9 | 2.96 |
| Crawford | 4 | 2.7 | 0.27 |
|  | 20 | 31.4 | 0.98 |

EXAMPLE IX

Example VIII is repeated except employing a blown polyethylene (obtained from Union Carbide Corporation and having a melt index of 2.02 and a density of 0.922 grams per cubic centimeter) film of about 1.5 mils in thickness. Table IV provides the results.

Table IV

| Location | Weeks in Soil | Weight % Loss With 0.25% Additive A | No Additive A |
|---|---|---|---|
| Lake Sardis | 4 | 0.92 | 0.1 |
|  | 20 | 13.95 | 1.0 |
| Anaheim | 4 | 1.7 | 0.1 |
|  | 20 | 10.3 | 1.0 |
| Crawford | 4 | 2.1 | 0.0 |
|  | 20 | 14.0 | 1.11 |

The tensile strength at yield at 20 inches per minute (ASTM D-638-68) of the films containing Additive A drops from about 1880 pounds per square inch to about 1300 to 1700 pounds per square inch after 20 weeks in soil immersion.

On the other hand, samples of polyethylene containing 0.25 weight percent Additive A which are stored under laboratory conditions of 75°F. and 55 percent relative humidity in an opaque bag for 10 months do not show any appreciable degradation.

EXAMPLE X

A milled film about 1.3 mils in thickness is prepared from polybutene-1 obtained from the Petro-TEx Corp. and having a melt index of 0.5 and 0.25 weight percent Additive A. The film is fused and is employed as a mulch for strawberry plants in Anaheim, California. The film is spread in early December. By the following May, there are visual signs of degradation of the film such as brittleness and cracking. The film can be easily tilled into the soil by conventional cultivating equipment in the summer. Examination of the surface and subsoil reveals small particles of decomposing polybutene film ranging in size from approximately 1 inch squares to pinheads.

A similar polybutene-1 film, except having an Additive A, is placed in the same strawberry field at the same time as above. After nine months, no signs of significant deterioration could be detected. The film could not be tilled into the soil using conventional cultivating equipment, and the film had to be rolled up and trucked away in order to commence cultivating.

The mixture of the composition of this invention and a commercially available, unmodified poly-α-olefin is not overly sensitive to degradation promoted by ultraviolet light. However, it may be desirable for certain commercial applications to modify the polymer with promoters for ultraviolet radiation degradation or to use a polymer which does not contain ultraviolet radiation degradation stabilizers which are normally present in commercially obtainable polymer. The following examples illustrate the effect weathering on polyethylene film containing various amounts of the additives of this invention under differing conditions of humidity, ultraviolet light radiation, temperature, and the like.

EXAMPLE XI

A cast polyethylene film of about 1 to 1.5 mils in thickness is obtained using essentially the same procedure as set forth in Example IV. The film contains low density polyethylene obtained from Northern Petrochemical Company having a melt index of about 2.0 and a density of about 0.924 grams per cubic centimeter and 0.25 weight percent of Additive A. The film is exposed to sourthern Florida sun and crazing occurs within 5 to 6 months whereas similar films without Additive A, which are identically exposed, craze in 9 to 12 months.

EXAMPLE XII

Cast films are prepared as in Examples IV and XI and are aged for two weeks, then placed in a Model XW, Atlas Electric Weatherometer employing a Xenon arc lamp, and the time to photodegradation, that is, where the polymer loses its useful properties is determined. Table V presents the results. As a comparison, this example is repeated except when the polyethylene is heated to 135°C., no Additive A is admixed therewith.

Table V

| Amount of Additive A, wt. % | Film Thickness, mils | Time to Degradation, hours |
|---|---|---|
| 0.05 | 1.2 | 1590 |
| 0.10 | 1.1 | 740 |
| 0.15 | 1.1 | 610 |

Table V-Continued

| Amount of Additive A, wt. % | Film Thickness, mils | Time to Degradation, hours |
|---|---|---|
| 0.20 | 1.2 | 500 |
| 0.25 | 1.1 | 410 |
| 0.35 | 1.1 | 315 |
| 0.40 | 1.1 | 300 |
| 0.50 | 1.2 | 280 |
| (control) | 1.1 | 1200 |

EXAMPLE XIII

Four groups of film are prepared in accordance with a procedure such as set forth in Example III. Group I is made from low density polyethylene obtained from the Union Carbide corporation and has a density of 0.922 grams per cubic centimeter and has incorporated therein 0.25 weight percent of Additive A based on the polymer. Group II is essentially the same as Group I except no Additive A is incorporated therein. Group III is made from low density polyethylene obtained from U.S. Industrial Chemicals Company, a division of National Distillers and Chemical Corp. and contains 0.25 weight percent of Additive A based on the polymer. Group IV is essentially the same as Group III except no Additive A is incorporated therein. The film for each group is portioned into five 8-inch by 12-inch samples and framed with flexible material around its outer perimeter. Two of the five samples from each group are further stapled onto a fiberglass screen as a backing. All the samples are then exposed in Miami, Florida, on a 45° angle facing south to normal weathering conditions for approximately 180 days, beginning in mid July. After about 4 months, the strength of the films decreased sufficiently that tears occurred due to wind, with the panels with the fiberglass backing being the first to show signs of ripping. There is no readily ascertainable difference between the Groups having Additive A therein and those not having Additive A with respect to the time in which sufficient deterioration of the films occurred to permit physical damage by the wind.

EXAMPLE XIV

Nine groups of compression molded film samples are prepared which are approximately 5 to 8 mil thick by compression at about 6000 pounds per square inch at 330°F for 10 minutes, then at an increased pressure of 40,000 pounds per square inch without heating until the samples are cool. The samples containing Additive A are prepared by dry blending Additive A with polymer, then roll milled at about 380°F. prior to forming the compression molded film. The samples are as follows:

Group I: low density polyethylene film (Northern Petrochemical TDX 101)

Group II: low density polyethylene film (Northern Petrochemical TDX 101) + 0.25% Additive A.

Group III: low density polyethylene film (Enjay LD 104)

Group IV: low density polyethylene film (Enjay LD 104) + 0.25% Additive A.

Group V: polypropylene film (Enjay CD 507)

Group VI: polypropylene film (Enjay CD 507) + 0.25% Additive A.

Group VII: polybutene-1 film (Petro-tex Bu-tuf XB 100)

Group VIII: polybutene-1 film (Petro-tex Bu-tuf XB 100) + 0.25% Additive A.

Group IX is extruded low density polyethylene film having a thickness of 1.5 mil.

The samples undergo outdoor time-weather texting under sub-tropical climatic conditions on 45 degree South exposure racks from April to September. The six month average temperature was 78°F.; relative humidity, 69; and rain 5.53 inches. The total Langleys (45°) for the period was about 58,000. The results are as follow:

Group I: Film cloudy after 6 months.
Group II: Film tearing badly after 6 months.
Group III: No deterioration after 6 months.
Group IV: Film brittle after 5 months.
Groups V and VI: complete degradation after 60 days.
Group VII: Complete degradation after 120 days.
Group VIII: Complete degradation after 90 days.
Group IX: No surface deterioration after 6 months.

EXAMPLE XV

Low density polyethylene films (U.S.I.) containing 0.25% Additive A are outdoor weather tested in Arizona. The exposure of the films was 379,900 Langleys. Films containing Additive A exhibit less deterioration after exposure than similar films without Additive A.

EXAMPLE XVI

Burial tests are conducted in Roanoke, Virginia, employing polypropylene with 0.25% Additive A. As a control, polycaprolactone (Union Carbide PCL-700) is employed. Polycaprolactone is reported by Union Carbide in publication F-44453 as being biodegradable. After 43 days burial in good topsoil, the polypropylene film contains 0.25% Additive A exhibited a weight loss of 4.65% and the polycaprolactone exhibited a weight loss of 3.83%.

Other burial tests and the like of poly-α-olefin polymers containing Additive A demonstrate that the rate of degradation may depend on conditions such as duration of test, temperature, humidity, etc.

It is claimed:

1. A polymer composition comprising a major amount of polymer of alpha-olefinic monomer containing about 2 to about 8 carbon atoms, a minor amount sufficient to promote degradation of the polymer composition of (a) para-alkanoylaminophenol wherein said alkanoyl group contains 2 to about 4 carbon atoms, and (b) para-alkanoylaminophenol, wherein said alkanoyl group has from about 3 to 21 carbon atoms and has a greater number of carbon atoms than the alkanoyl group of (a), and wherein the weight ratio of (b) to (a) is at least about 1:10, such that the total amount of (a) and (b) enhances degradation of the polymer.

2. A polymer composition comprising a major amount of polymer of alpha-olefinic monomer, containing about 2 to 8 carbon atoms, about 0.01 to 3 weight percent based on said polymer, of (a) para-alkanoylaminophenol wherein said alkanoyl group contains 2 to about 4 carbon atoms, and (b) para-alkanoylaminophenol, wherein said alkanoyl group has from about 3 to 21 carbon atoms and has a greater number of carbon atoms than the alkanoyl group of (a), and wherein the weight ratio of (b) to (a) is at least about 1:10.

3. The polymer composition of claim 1 wherein the polymer is of monomer selected from the group consisting of ethylene, propylene and butene-1.

4. The polymer composition of claim 1 wherein the polymer is polyethylene.

5. The polymer composition of claim 1 wherein the polymer is poly(butene-1).

6. The polymer composition of claim 1 wherein the total amount of (a) and (b) is about 0.03 to 4 weight percent of the polymer composition.

7. The polymer composition of claim 6 wherein (a) is para-acetylaminophenol.

8. The polymer composition of claim 6 wherein (b) is para-butyroylaminophenol.

9. The polymer composition of claim 8 wherein (a) is para-acetylaminophenol.

10. The polymer composition of claim 9 wherein the polymer is poly(butene-1).

11. The polymer composition of claim 1 further comprising (c) dispersant which assists in the dipersion of the para-alkanoylaminophenols in the polymer in a weight ratio of (c) to (a) and (b) of about 1:9 to 5:1.

12. The polymer composition of claim 11 wherein (c) is an acid having at least one carboxylic group and about 10 to 30 carbon atoms.

13. The polymer composition of claim 12 wherein (c) is stearic acid.

14. The polymer composition of claim 11 wherein (a) is para-acetylaminophenol.

15. The polymer composition of claim 11 wherein (b) is para-butyroylaminophenol.

16. The polymer composition of claim 15 wherein (a) is para-acetylaminophenol.

17. A composition for enchancing the degradation of polymers of alpha-olefinic monomers containing about 2 to 8 carbon atoms, comprising (a) para-alkanoylaminophenol wherein said alkanoyl group contains 2 to about 4 carbon atoms, and (b) paraalkanoylaminophenol wherein said alkanoyl group has from about 3 to 21 carbon atoms and has a greater number of carbon atoms than the alkanoyl group of (a), and wherein the weight ratio of (b) to (a) is about 1:10 to 2:1.

18. The composition of claim 17 wherein (a) is paraacetylaminophenol.

19. The composition of claim 17 wherein (b) is parabutyroylaminophenol.

20. The composition of claim 18 wherein (b) is parabutyroylaminophenol.

21. The composition of claim 17 which further includes (c) dispersant which assists in the dispersion of the paralkanoylaminophenols in the polymer in a weight ratio of (c) to (a) and (b) of about 1:9 to 5:1.

22. The composition of claim 21 wherein (c) is an acid having at least one carboxylic group and about 10 to 30 carbon atoms.

23. The composition of claim 22 wherein (c) is stearic acid.

24. The composition of claim 22 wherein (c) is in an amount sufficient to provide a melting point of the composition in the range of about 125° to 160°C.

25. The composition of claim 21 wherein (a) is paraacetylaminophenol.

26. The composition of claim 21 wherein (b) is parabutyroylaminophenol.

27. The composition of claim 25 wherein (b) is parabutyroylaminophenol.

* * * * *